(12) United States Patent
Tiefenbach

(10) Patent No.: US 9,263,887 B2
(45) Date of Patent: Feb. 16, 2016

(54) BATTERY SYSTEM AND METHOD FOR PROVIDING AN INTERMEDIATE VOLTAGE

(75) Inventor: Andy Tiefenbach, Vaihingen-Horrheim (DE)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 14/126,831

(22) PCT Filed: Apr. 23, 2012

(86) PCT No.: PCT/EP2012/057374
§ 371 (c)(1),
(2), (4) Date: Dec. 16, 2013

(87) PCT Pub. No.: WO2012/171686
PCT Pub. Date: Dec. 20, 2012

(65) Prior Publication Data
US 2014/0117763 A1    May 1, 2014

(30) Foreign Application Priority Data

Jun. 17, 2011   (DE) .......................... 10 2011 077 708

(51) Int. Cl.
*H02J 7/00* (2006.01)
*H02J 1/00* (2006.01)
(Continued)

(52) U.S. Cl.
CPC ............... *H02J 1/00* (2013.01); *B60L 11/1866* (2013.01); *B60L 11/1879* (2013.01);
(Continued)

(58) Field of Classification Search
CPC ....................................................... H02J 7/0016
USPC ......................................................... 320/116
See application file for complete search history.

(56) References Cited

U.S. PATENT DOCUMENTS 5,543,245 A    8/1996  Andrieu et al.

2003/0071523 A1    4/2003  Silverman
(Continued)

FOREIGN PATENT DOCUMENTS

WO    2007128876    11/2007

OTHER PUBLICATIONS

International Search Report for Application No. PCT/EP2012/057374 dated Oct. 2, 2012 (2 pages).
(Continued)

*Primary Examiner* — Edward Tso
*Assistant Examiner* — Ahmed Omar
(74) *Attorney, Agent, or Firm* — Michael Best & Friedrich LLP

(57) ABSTRACT

The invention relates to a battery system (10), comprising a battery module (11), which comprises a first high-voltage connection (12a), a second high-voltage connection (12b) and a multiplicity of battery cell modules (11a, ..., 11n) which are connected in series between the first and second high-voltage connections, and a switching matrix (13). The switching matrix comprises a large number of switching rails (14), which are each connected to one of the nodes between in each case two of the battery cell modules which are connected in series, a multiplicity of first switching devices (15a), which are designed to connect in each case one of the switching rails (14) to a first low-voltage connection (13a) of the switching matrix (13), and a multiplicity of second switching devices (15b), which are designed to connect in each case one of the switching rails (14) to a second low-voltage connection (13b) of the switching matrix. In this case, a first total voltage (HV) of all of the battery cell modules (11a, ..., 11n) which are connected in series is present between the first high-voltage connection (12a) and the second high-voltage connection (12b), and a second total voltage (LV) of some of the battery cell modules (11a, ..., 11n) which are connected in series is present between the first low-voltage connection (13a) and the second low-voltage connection (13b), depending on the switching state of the first switching devices (15a) and the second switching devices (15b).

9 Claims, 2 Drawing Sheets

(51) Int. Cl.
*B60L 11/18* (2006.01)
*H01M 10/42* (2006.01)
*H01M 10/48* (2006.01)

(52) U.S. Cl.
CPC ......... *H01M 10/425* (2013.01); *H01M 10/482* (2013.01); *H02J 7/0016* (2013.01); *H02J 7/0024* (2013.01); *B60L 2240/547* (2013.01); *H01M 2010/4271* (2013.01); *H01M 2220/20* (2013.01); *Y02T 10/7005* (2013.01); *Y02T 10/7011* (2013.01); *Y02T 10/7055* (2013.01); *Y02T 10/7061* (2013.01); *Y10T 307/609* (2015.04)

(56) References Cited

U.S. PATENT DOCUMENTS

2008/0211459 A1* 9/2008 Choi .......................... 320/134
2009/0218986 A1  9/2009 Jarvinen

OTHER PUBLICATIONS

Accession No. 2000-409051, "Individual cell management system for battery storage uses detection algorithm and active identification of capacity limiting individual battery or cell, with performance of each battery being monitored throughout life of battery module," RD-432128, Oct. 4, 2000.

* cited by examiner

BATTERY SYSTEM AND METHOD FOR PROVIDING AN INTERMEDIATE VOLTAGE

BACKGROUND OF THE INVENTION

The invention relates to a battery system and a method for providing an intermediate voltage, in particular in traction batteries for electric vehicles.

Electric energy sources, in particular mobile electrical energy sources, for example traction batteries for electrically operated vehicles, frequently comprise rechargeable energy stores, for example lithium-ion batteries, which energy stores provide an output voltage of more than 12 volts. Control devices are used to control and monitor the energy store, which control devices typically require a supply voltage, for example exactly 12 volts, which is lower than the high voltage that is provided by the energy store. This low voltage or also vehicle voltage can be provided by a second battery, for example a lead acid battery or generated by means of a DC current conversion from the high voltage of the energy store.

Energy stores for electric vehicles frequently comprise a series connection of where necessary parallel connected individual cells that comprise a low intrinsic voltage. A total voltage can be generated from the low intrinsic voltages by way of the series connection of the individual cells, which total voltage can be used in a range that spans several hundred volts for providing the high voltage, for example the traction voltage.

Owing to the fact that individual cells of an energy store comprise production related variations of the performance parameters, the individual battery cells are subject to greatly different loadings and/or comprise different charge conditions after a particular period of operation of the energy store despite having the same starting charge condition. Owing to the fact that battery cells with the weakest charge condition significantly influence the performance of an energy store that is constructed in a series connection, methods are used that can ensure a so called "cell balancing", in other words a balancing of the charge conditions of the individual battery cells. In particular, in the case of lithium-ion batteries, the performance, serviceable life and efficiency of the entire energy store can be improved using these methods. It is possible using active methods to move a capacitive or inductive charge from battery cells that have a higher charged condition to battery cells having weaker charge conditions using active methods. Passive methods partially discharge selective individual battery cells, in dependence upon their relative charge condition.

A method for cell condition balancing in a battery system having series-connected battery cells is disclosed in the publication WO 2007/128876 A1, in which weaker battery cells are selectively supplied with energy from cell-specific charge devices in order to equalize the charge condition of all the battery cells.

SUMMARY OF THE INVENTION

The present invention relates to a battery system having a battery module that comprises a first high voltage connector, a second high voltage connector and a plurality cell modules that are connected in series between the first and second high voltage connector, and said battery system having a switching matrix that comprises a plurality of switching rails that are connected in each case to one of the nodes between in each case two of the series-connected battery cell modules, a plurality of first switching devices that are embodied for the purpose of connecting in each case one of the switching rails to a first low voltage connector of the switching matrix, and a plurality of second switching devices that are embodied for the purpose of connecting in each case one of the switching rails to a second low voltage connector of the switching matrix, wherein a first total voltage of all series-connected battery cell modules is available between the first and the second high voltage connector, and wherein a second total voltage of a part of the series-connected battery cell modules can be tapped between the first and the second low voltage connector in dependence upon the switching state of the first and second switching devices.

In accordance with a further embodiment, the invention provides a method for generating an intermediate voltage in a battery system in accordance with the invention, said method comprising the steps of determining the charge condition of the series-connected battery cell modules, selecting a predefined number of battery cell modules, which comprise the highest charge condition, and controlling the first and second switching devices of the switching matrix so that a total voltage of the selected battery cell modules can be tapped between the first and second low voltage connector in dependence upon the switching state of the first and second switching devices.

A fundamental idea of the invention is to improve the performance of an electrical energy store that is constructed from a series connection of individual cells, in that an optimal capacity utilization of each individual battery cell is achieved. A switching matrix is therefore used, which can selectively select a group of battery cells in dependence upon their charge condition by way of a plurality of switching devices, in order to use the group of battery cells to generate an intermediate voltage, in particular for providing a vehicle voltage or a voltage supply for control devices of the electrical energy store. As a consequence, two substantial advantages are evident: firstly, the aging process of the individual cells is slowed down as a result of the uniform loading of the battery cells, since only the strongest battery cells at the time are used to generate the intermediate voltage. Secondly, a secondary battery is not required, as two different output voltages can be generated using a single energy store.

An energy store constructed in this manner consequently offers an improved performance on the basis of a slower aging process, uniform cell loading and reduced dependence upon production tolerances. It is advantageously possible to identify charge conditions of the battery cell modules using charge monitoring devices that are typically already available in conventional lithium-ion batteries. If necessary, further variables that are derived from the battery management system are used to determine the state of health (SOH) of the battery cell modules.

It is advantageously possible to provide further switching devices that are embodied for the purpose of connecting in each case one of the switching rails to first and second intermediate connectors of the switching matrix, wherein a partial voltage is available between the low voltage connectors and in each case one of the intermediate connectors, which partial voltage can be added to a total voltage by way of a series connection. As a consequence, the intermediate voltage can be varied, depending on how many of the battery cell modules are used for generating the intermediate voltage.

The battery system can be advantageously equipped with DC current converters, which in each case can convert the intermediate voltage. As a consequence, the advantage is evident, that the vehicle electrical system, which is supplied with the intermediate voltage can be separated galvanically from the high voltage system.

In accordance with an advantageous embodiment, the battery system can comprise a plurality of connection devices having a series connection of an ohmic resistor and a switch, so that individual battery cell modules can be selectively partially discharged and/or partially loaded by way of the ohmic resistor by means of closing the switch. As a consequence, a smoother adjustment of the charge condition balancing can be performed.

DESCRIPTION OF THE DRAWINGS

Further features and advantages of embodiments of the invention are evident from the following description with reference to the attached drawings.

In the drawings.

DETAILED DESCRIPTION

Figure 1:
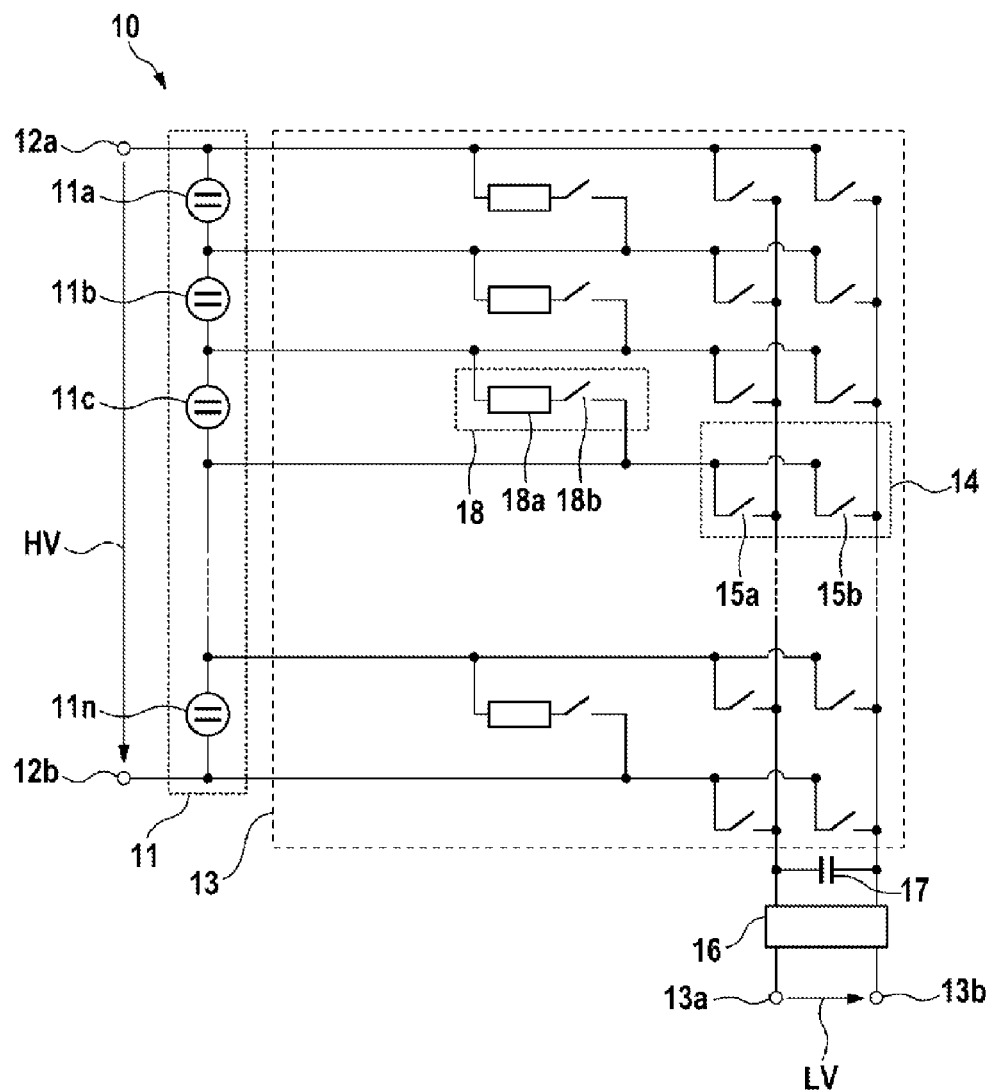
FIG. 1 illustrates a schematic illustration of a battery system in accordance with an embodiment of the invention.

FIG. 1 illustrates a schematic illustration of a battery system 10 having a battery module 11 and a switching matrix 13. The battery module 11 comprises a plurality of series-connected battery cell modules 11a, 11b, 11c, . . . , 11n. It is possible that the battery cell modules 11a, 11b, 11c, . . . , 11n are by way of example lithium-ion batteries. The battery module 11 comprises two high voltage connectors 12a, 12b, at which an output voltage HV, for example a traction voltage of the battery system 10, is available. The output voltage HV can for example be a high voltage and can amount to several hundred volts.

The switching matrix comprises a plurality of switching rails 14, which are connected in each case to nodes between two battery cell modules 11a, 11b, 11c, . . . , 11n. Further switching rails 14 are connected to the high voltage connectors 12a, 12b of the battery module 11. For reasons of clarity only one switching rail 14 in FIG. 1 is provided with reference numerals. The switching rails 14 are connected in a switchable manner in each case to a first low voltage connector 13a of the switching matrix 13 by way of a first switching device 15a and to a second low voltage connector 13b of the switching matrix 13 by way of a second switching device 15b. The first and second switching devices 15a, 15b can comprise for example semiconductors, by way of example IGBT- or MOSFET-switches.

It is possible in each case to close one of the first switching devices 15a and one of the second switching devices 15b in order to generate an intermediate voltage LV between the low voltage connectors 13a and 13b, so that one or a plurality of the battery cell modules 11a, 11b, 11c, . . . , 11n are connected between the low voltage connectors 13a and 13b. Using the switching matrix 13 in accordance with FIG. 1, it is only possible in each case to connect adjacent battery cell modules 11a, 11b, 11c, . . . , 11n between the low voltage connectors 13a and 13b. It is possible to select a predefined number of adjacent battery cell modules 11a, 11b, 11c, . . . , 11n, which are used to generate the intermediate voltage LV. For example, the battery cell modules 11a, 11b, 11c, . . . , 11n in each case can provide a single voltage of 4 volts and the predefined number can amount to three. In this manner, an intermediate voltage LV of 3×4 volts=12 volts can be tapped at the low voltage connectors 13a and 13b. It is naturally likewise possible to use each differing number of adjacent battery cell modules 11a, 11b, 11c, . . . , 11n to generate the intermediate voltage LV.

In dependence upon the predefined number, it is possible for reasons of efficiency to omit a part of the plurality of first and/or second switching devices 15a and 15b. For example, the second switching devices 15b of the upper three switching rails 14 in FIG. 1 and the first switching devices 15a of the lower three switching rails 14 in FIG. 1 cannot be embodied, if the three adjacent battery cell modules 11a, 11b, 11c, . . . , 11n are used to generate the intermediate voltage.

Furthermore, the battery system 10 can comprise a direct current voltage intermediate circuit with a capacitor 17 that is coupled between the first low voltage connector 13a and the second low voltage connector 13b of the switching matrix 13. Moreover, it is possible to provide a DC current converter 16 that converts the intermediate voltage LV. It is possible for the DC current converter 16 to comprise a conversion ratio of 1:1, so that it is only used for the galvanic decoupling of the intermediate voltage circuit, for example of the vehicle electrical system of an electrically operated vehicle. However, it is also possible to omit the DC current converter 16 in order to simplify the battery system 10 and for example to optimize the weight for mobility purposes.

The battery system 10 can comprise connection devices 18, which in each case can bridge two adjacent switching rails 14 by way of a series connection of an ohmic resistor 18a and a switch 18b. As a consequence, the battery cell modules 11a, 11b, 11c, . . . , 11n can only be partially loaded, in that the associated switch 18b is closed, and a part of the current flows through the ohmic resistor 18a instead of through the corresponding battery cell module 11a, 11b, 11c, . . . , 11n. The ohmic resistor 18a can be in particular a high resistance resistor for this purpose.

The intermediate voltage LV that is provided on the low voltage connectors 13a and 13b, can for example be used to supply control devices of the battery system 10. It can however also be possible to charge a low voltage battery with the intermediate voltage LV. As a consequence, a buffer store can be advantageously provided, by way of which the individual battery cell modules 11a, 11b, 11c, . . . , 11n can be selectively charged. A DC current converter 16 can be embodied in a bidirectional manner for this purpose. Consequently, when charging the battery module 11, the weakest battery cell modules could be supplied with additional energy from the low voltage battery in order to equalize differences in the cell charges.

Figure 2:
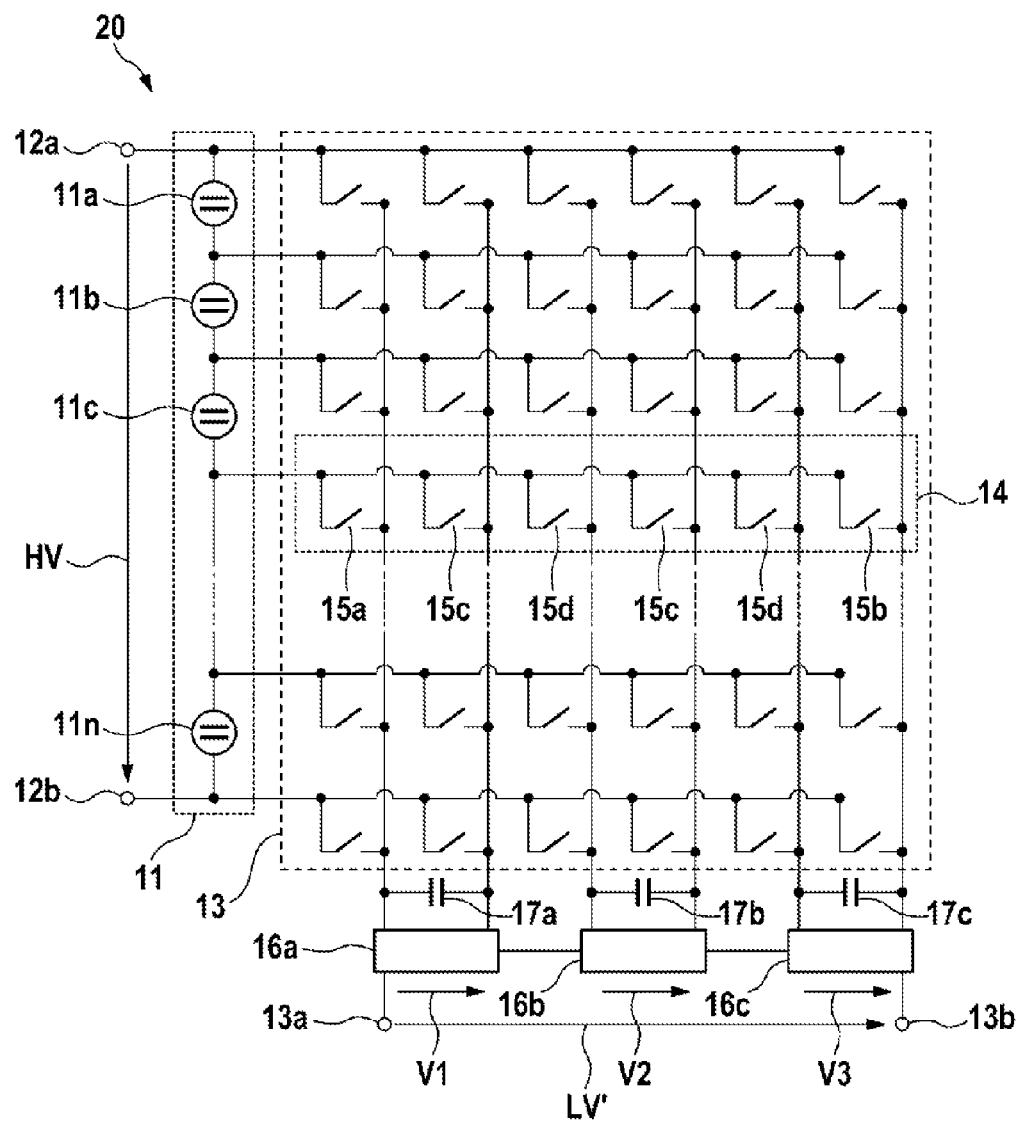
FIG. 2 illustrates a schematic illustration of a battery system in accordance with a further embodiment of the invention.

FIG. 2 illustrates a schematic illustration of a battery system 20. The battery system 20 differs from the battery system 10 that is illustrated in FIG. 1 by virtue of the fact that a plurality of third and fourth switching devices 15c and/or 15d is provided, which in each case can connect one of the switching rails 14 to intermediate connectors of the switching matrix 13. The battery system 20 can comprise a plurality of DC current converters 16a, 16b, 16c, which are connected in each case between low voltage connectors and intermediate connectors of the switching matrix, and whose output connectors are connected in a series connection, so that an intermediate voltage LV' can be tapped at the low voltage connectors 13a and 13b, which intermediate voltage constitutes a total voltage of the output voltages V1, V2, V3 of the respective DC current converters 16a, 16b, 16c.

With the aid of additional switching devices 15c, 15d, specific, individual as well as non-adjacent battery cell modules 11a, 11b, 11c, . . . , 11n in the battery system 20 can be selected, which battery cell modules are used in order to generate the intermediate voltage LV'. For example, the three battery cell modules 11a, 11b, 11c, ..., 11n with the strongest charge condition can be determined, and the switching devices 15a, 15b, 15c, 15d are correspondingly controlled, so that each of the three selected battery cell modules 11a, 11b, 11c, ..., 11n supplies a DC current converter 16a, 16b, 16c, so that the intermediate voltage LV' is dependent on the total of the single voltages of the three selected battery cell modules 11a, 11b, 11c, ..., 11n. By way of example the single voltage of a battery cell module 11a, 11b, 11c, ..., 11n can amount to 4 volts. If the DC current converters 16a, 16b, 16c comprise a conversion ratio of 1:1, an intermediate voltage LV' of 12 volts can be provided between the low voltage connectors 13a and 13b. It goes without saying that the number of intermediate connectors and/or DC current converters in FIG. 2 is only an example, and that it is likewise possible to provide more or fewer intermediate connectors and/or DC current converters in the battery system 20.

Likewise, direct current voltage intermediate circuits having capacitors 17a, 17b and 17c can be coupled in each case between the low voltage connectors and the intermediate connectors.

Figure 3:
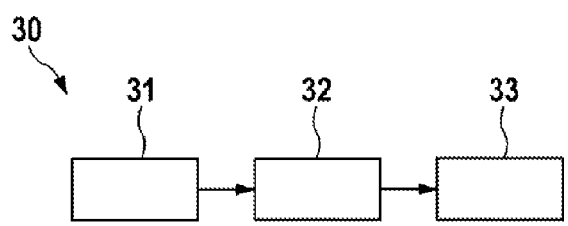
FIG. 3 illustrates a schematic illustration of a method for generating an intermediate voltage in a battery system in accordance with a further embodiment of the invention.

FIG. 3 illustrates a schematic illustration of a method 30 for generating an intermediate voltage in a battery system, in particular in a battery system 10 or 20 in accordance with one of FIGS. 1 and 2. In a first step 31, the charge condition of the series-connected battery cell modules 11a, 11b, 11c, ..., 11n of the battery module 11 is determined. In a second step 32, a selection is made of a predefined number of battery cell modules 11a, 11b, 11c, ..., 11n, which comprise the highest charge condition. In a third step 33, the first and second switching devices 15a, 15b of the switching matrix 13 are then controlled so that a total voltage of the selected battery cell modules 11a, 11b, 11c, ..., 11n can be tapped between the first and the second low voltage connector 13a, 13b, in dependence upon the switching state of the first and second switching devices 15a, 15b.

Using the method 30, the battery cell modules 11a, 11b, 11c, ..., 11n with the prevailing strongest charge condition can be specifically selected to generate the intermediate voltage and/or total voltage LV. The selected battery cell modules 11a, 11b, 11c, ..., 11n are then simultaneously used for the operation in the low voltage supply and for the operation of the high voltage supply. The low voltage can be adjusted to a desired value with the aid of a DC current converter. The charge condition of all battery cell modules 11a, 11b, 11c, ..., 11n can be continuously monitored so that the selected battery cell modules 11a, 11b, 11c, ..., 11n can be changed in the event of the charge condition of the currently selected battery cell modules 11a, 11b, 11c, ..., 11n falling below the charge condition of another battery cell module 11a, 11b, 11c, ..., 11n that is currently not selected. A threshold value can be provided for this purpose and it is necessary for the difference between the charge conditions of the battery cell modules 11a, 11b, 11c ..., 11n to exceed said threshold value prior to the selected battery modules 11a, 11b, 11c, ..., 11n being changed in order to avoid a constant switching of the switching devices 15a, 15b.

As an alternative thereto, it is also possible to use an active pulse method to generate the intermediate voltage LV, wherein all of the battery cell modules 11a, 11b, 11c, ..., 11n are used in periodic intervals to generate the intermediate voltage, and wherein the relative frequency of the activation depends upon the charge condition of the respective battery cell modules 11a, 11b, 11c, ..., 11n.

The invention claimed is:
1. A battery system (10), having:
   a battery module (11) that comprises a first high voltage connector (12a), a second high voltage connector (12b) and a plurality of battery cell modules (11a, ..., 11n) that are connected in series between the first and second high voltage connector; and
   said battery system having a switching matrix (13) that comprises:
   a plurality of switching rails (14) that are connected in each case to one of the nodes between in each case two of the battery cell modules (11a, ..., 11n) that are connected in series,
   a plurality of first switching devices (15a) that are embodied for the purpose of connecting in each case one of the switching rails (14) to a first low voltage connector (13a) of the switching matrix (13),
   a plurality of second switching devices (15b) that are embodied for the purpose of connecting in each case one of the switching rails (14) to a second low voltage connector (13b) of the switching matrix (13),
   a plurality of third switching devices (15c) that are embodied for the purpose of connecting respectively one of the switching rails (14) to a first intermediate connector of the switching matrix (13), and
   a plurality of fourth switching devices (15d) that are embodied for the purpose of connecting respectively one of the switching rails (14) to a second intermediate connector of the switching matrix (13),
   wherein a first total voltage (HV) of all series-connected battery cell modules (11a, ..., 11n) is available between the first (12a) and the second high voltage connector (12b),
   wherein a second total voltage (LV) of a part of the series-connected battery cell modules (11a, ..., 11n) is available between the first (13a) and the second low voltage connector (13b) in dependence upon the switching state of the first (15a) and second switching devices (15b),
   wherein a third total voltage of a part of the series-connected battery cell modules (11a, ..., 11n) is available between the first low voltage connector (13a) and the first intermediate connector in dependence upon the switching state of the first (15a) and third switching devices (15c) and
   wherein a fourth total voltage of a part of the series-connected battery cell modules (11a, ..., 11n) is available between the second low voltage connector (13b) and the second intermediate connector in dependence upon the switching state of the second (15b) and fourth switching devices (15d).

2. The battery system (10) as claimed in claim 1, wherein the switching matrix (13) further comprises:
   two further switching rails (14) that are connected in each case to the first (12a) and
   the second high voltage connector (12b), and
   further first and second switching devices (15a, 15b) that are embodied in each case for the purpose of connecting respectively one of the two further switching rails (14) to the first low voltage connector (13a) or the second low voltage connector (13b) of the switching matrix (13).

3. The battery system as claimed in claim 1, further having:
   a first DC current converter (16a) with two input connectors that are coupled to the first low voltage connector (13a) and the first intermediate connector; and
   a second DC current converter (16c) with two input connectors that are coupled to the second low voltage connector (13b) and the second intermediate connector, wherein the first and the second DC current converters (16*a*, 16*c*) are connected in series in each case by way of output connectors, so that a current-converted total voltage (LV') of the third and fourth total voltage is available in each case between second output connectors of the first and second DC current converters (16*a*, 16*c*).

4. The battery system (10) as claimed in claim 3 further having:
- a first direct current voltage intermediate circuit with a first capacitor (17*a*) that is coupled between the first low voltage connector (13*a*) and the first intermediate connector; and
- a second direct current voltage intermediate circuit with a second capacitor (17*c*) that is coupled between the second low voltage connector (13*b*) and the second intermediate connector.

5. The battery system (10) as claimed in claim 1, further having:
- a DC current converter (16) with two input connectors that are coupled between the first (13*a*) and second low voltage connectors (13*b*) as well as having two output connectors at which it is possible to tap a current-converted second total voltage.

6. The battery system (10) as claimed in claim 1, further having:
- a direct current voltage intermediate circuit with a capacitor (17) that is coupled between the first (13*a*) and the second low voltage connector (13*b*).

7. The battery system (10) as claimed in claim 1, further having:
- a plurality of connection devices (18) that in each case comprise a series connection of an ohmic resistor (18*a*) and a switch (18*b*), and that are coupled between in each case two of the switching rails (14) of the switching matrix (13).

8. A method (30) for generating an intermediate voltage (LV) in a battery system (10) as claimed in claim 1, comprising the steps of:
- determining the charge condition of the series-connected battery cell modules (11*a*, . . . , 11*n*);
- selecting a predefined number of battery cell modules (11*a*, . . . , 11*n*), which comprise the highest charge condition; and
- controlling the first and second switching devices (15*a*, 15*b*) of the switching matrix, in such a manner that a total voltage (LV) of the selected battery cell modules (11*a*, . . . , 11*n*) is available between the first and second low voltage connector (13*a*, 13*b*) in dependence upon the switching state of the first and second switching devices (15*a*, 15*b*).

9. The method (30) as claimed in claim 8, wherein the charge condition of the selected battery cell modules (11*a*, . . . , 11*n*) is compared to the charge condition of the remaining battery modules (11*a*, . . . , 11*n*), and wherein the selection of the battery cell modules (11*a*, . . . , 11*n*) is changed as soon as the charge condition of the currently selected battery cell modules (11*a*, . . . , 11*n*) falls below the charge condition at least of one of the remaining battery cell modules (11*a*, . . . , 11*n*).

\* \* \* \* \*